(No Model.)
E. FOURNIER.
SYRINGE.
No. 605,476.
Patented June 14, 1898.
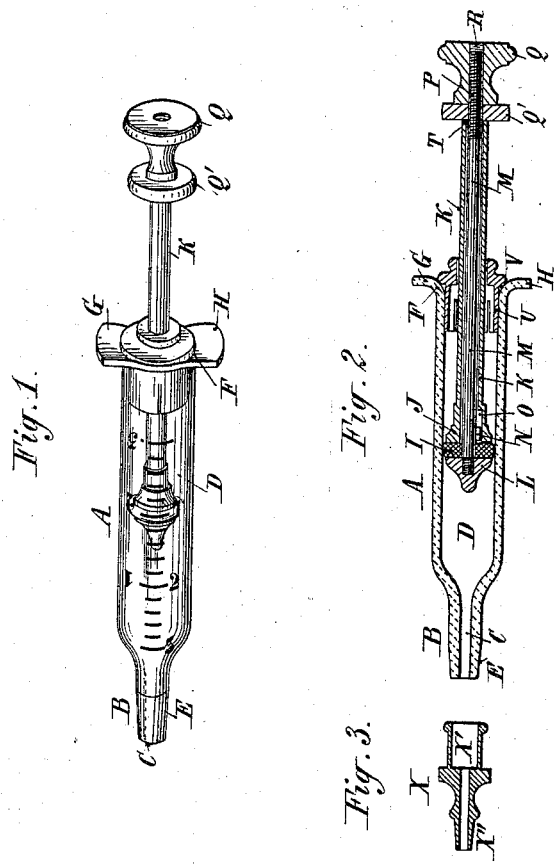
Witnesses:
H. K. Boulter
C. Thornhup
Inventor,
Eugene Fournier,
By Wm. E. Boulter,
Attorney

UNITED STATES PATENT OFFICE.

EUGENE FOURNIER, OF PARIS, FRANCE.

SYRINGE.

SPECIFICATION forming part of Letters Patent No. 605,476, dated June 14, 1898.

Application filed May 13, 1897. Serial No. 636,365. (No model.)

*To all whom it may concern:*

Be it known that I, EUGENE FOURNIER, a citizen of the Republic of France, residing at Paris, France, have invented certain new and useful Improvements in or Relating to Hypodermic and Like Syringes, of which the following is a specification.

The syringe forming the subject of the present invention is represented in the accompanying drawings, in which—

Figure 1 is a perspective view, Fig. 2 a longitudinal section, and Fig. 3 a detail view.

The syringe consists, chiefly, of a glass tube A, the cylindrical part of which is graduated, the graduations being preferably in cubic centimeters and fractions of centimeters and marked in figures on both sides, the figures being in opposite directions, so as to enable the indications to be easily read, whether the syringe be used for injecting or for drawing out. One end B of the tube forms a point with an internal passage C, forming a continuation of the hollow cylindrical interior D. The outer surface of the end B is ground at E to receive the setting or socket of the injecting-needles. The other end of the tube has preferably a collar or flange F of such shape as to form two lugs G H, forming finger-rests for the user.

In the interior D moves an expanding or elastic piston constituted by a rubber washer I, the diameter of which can be increased or decreased as it is held between a shoulder J at the end of a preferably cylindrical tube K, forming the piston-rod, and a head L, secured at the end of another rod M, placed inside the tubular piston-rod K and projecting at each end beyond the latter. The rubber washer I is thus carried by the inner rod M, which is provided with a hook or projection N, engaging with and longitudinally movable in a corresponding recess O in the inner surface of the shoulder J of the tubular piston-rod K. The other end of the inner rod M has a screw-threaded portion P, on which is screwed a milled head Q, with corresponding inner screw-thread R and a milled washer Q', forming a nut on the inner rod M, below the knob Q, and resting directly on the corresponding end T of the piston-rod K.

A thin and flexible metal or like socket U closes the upper orifice V of the tube A. This socket also acts as a guide to the piston-rod K, passing through its center.

All the different hereinbefore-described parts being put together in the manner clearly shown in Fig. 2, it will be understood that the regulating of the tightness of the piston in the syringe is effected by screwing the washer-nut Q', which rests always against the end of the hollow rod K, up or down the inner rod M, and when the degree of tightness has thus been regulated it is insured by firmly screwing down the knob Q on the rod M against the corresponding surface of the washer Q'. During the screwing of the nut-washer Q' on the rod M the latter cannot turn in the piston-rod K, as its projection N engages with the corresponding recess O of said piston-rod. When the washer-nut, pressing against the end T of the tubular piston-rod K, is rotated or screwed up, it will pull the inner rod M upward, and consequently bring the head L nearer the shoulder J, and thus compress and expand the rubber washer I, while the unscrewing of the nut-washer Q' will, on the contrary, permit the rubber washer I to contract by moving the inner rod M in the opposite direction and moving the head L farther away from the shoulder J.

The inner screw-threaded portion R of the knob Q preferably extends right through the latter. The inner recess O in the tubular piston-rod K is made of sufficient length to enable the inner rod M to be moved to a sufficient extent in the tubular rod K for the required degree of regulation of the syringe.

The result of the combination of the nut-washer Q' and knob Q is that if the latter is accidentally unscrewed during the manipulation of the syringe it cannot influence the degree of fitting of the piston, which will remain the same, owing to the nut-washer Q' being independent of the knob Q.

The injecting-needles to be used with my syringe are formed so that they can be fixed directly onto the ground portion E of the point of the syringe B, but as it is desirable to enable any needles at present in use to be used with my syringe I provide it with a special holder X, Fig. 3, having a socket X', adapted to be fixed onto the end E of the syringe, and with a point X'' for receiving any kind of injection-needle which could not be directly fixed to the end E of the syringe.

I claim—

In a hypodermic syringe, the combination with the cylinder or tube having one end shaped as described and being flanged at the other end to provide finger-rests, of a tubular rod arranged within the cylinder and provided with a recess toward its inner end, a second rod arranged within the first, a head on the inner end of the second rod a projection also on the latter rod engaging within the recess in the tubular rod, an elastic washer on the said second rod confined between the head and the inner end of the tubular rod, and an adjusting-nut screwed upon the outer end of the second rod and bearing against the outer end of the tubular rod.

In testimony whereof I have hereunto set my hand in presence of the two subscribing witnesses.

EUGENE FOURNIER.

Witnesses:
LOUIS SULLIGER,
EDWARD P. MACLEAN.